United States Patent [19]

Murphy et al.

[11] 4,012,784
[45] Mar. 15, 1977

[54] VOICE LOGGING RECORDER INCLUDING DECKS DEDICATED FOR BOTH LOGGING AND RECALL OPERATIONS

[75] Inventors: Robert L. Murphy, Oxnard; Dan J. Argento, Thousand Oaks, both of Calif.

[73] Assignee: Minnesota Mining & Manufacturing Company, St. Paul, Minn.

[22] Filed: Nov. 28, 1975

[21] Appl. No.: 635,871

[52] U.S. Cl. .................................... 360/5; 360/22; 360/63

[51] Int. Cl.² .................. G11B 15/02; G11B 27/30

[58] Field of Search ................ 360/5, 6, 13, 22, 62, 360/63, 61, 69

[56] References Cited

UNITED STATES PATENTS 3,375,526  3/1968  Finlay .................................... 360/5
3,662,121  5/1972  Cruger .................................. 360/62

Primary Examiner—Vincent P. Canney
Attorney, Agent, or Firm—Cruzan Alexander; Donald M. Sell; William B. Barte

[57] ABSTRACT

A voice actuated voice logging recorder includes logging decks and a recall deck such that voice data may be recorded or played back in the recall deck without interruption of the recording of voice data onto the tape of the logging deck. The invention further includes networks for recording a time code modulated by a unique signal indicative of the beginning of each message of voice data and for automatically repositioning the tape of the recall deck in response to the detection of the unique signal.

13 Claims, 4 Drawing Figures

VOICE LOGGING RECORDER INCLUDING DECKS DEDICATED FOR BOTH LOGGING AND RECALL OPERATIONS

CROSS REFERENCE TO RELATED APPLICATION

This application relates to a copending application by Messrs. Pastor, Erickson and Kahn Ser. No. 636,320 filed Nov. 28, 1975, filed the same day herewith in which a tape cassette drive apparatus preferably utilized in a data logging recorder such as that of the present invention is disclosed and claimed. This application also relates to a copending application filed the same day herewith by Messrs. Pastor and Argento in which a cassette voice logging recorder having a verification network to ensure operability of the decks is disclosed and claimed Ser. No. 635,872, filed Nov. 28, 1975.

BACKGROUND OF THE INVENTION

1. Field of the Invention

This invention relates to magnetic tape recorders, especially to those designed for use in continuous duty, data logging applications.

2. Description of the Prior Art

Voice-activated, voice logging recorders are widely used in monitoring such communications as those involving police, fire and aircraft and in providing accurate records of business meetings, legal proceedings, educational material, etc. Such recorders generally utilize one or more decks which are dedicated to logging incoming data, i.e., recording the incoming data together with a time code to enable subsequent retrieval of both the data and knowledge of the time at which it was recorded. When it was desired to play back a recently recorded message, the recorded tape would be replaced by a fresh tape and taken to a playback unit. The tape would there be rewound and the beginning of the desired message located by trial and error. Since there was often an emergency, the inability to quickly obtain the information in the message has been quite frustrating. These dedicated decks have been unuseable for providing a record from which could be recalled recently recorded data in a manner in which the beginning of each recorded message could be readily accessed without interrupting the logging of newly received data onto the decks.

SUMMMARY OF THE INVENTION

The voice logging recorder of the present invention enables virtually instantaneous recall of recorded voice data by supplementing the dedicated logging tape decks with a recall deck that is equipped to record and play back voice data while such data is being recorded onto a logging deck. The novel recorder includes a network enabling intermittent actuation of both the logging and recall decks in response to an input signal associated with the beginning of a message containing the voice data to log the voice data onto the tape of each deck. In order to enable the recall of a given message recorded on the recall deck, the novel recorder includes means for recording onto the recall deck a predetermined signal pulse upon the actuation of the decks in response to each input signal and means for sensing each recorded signal pulse during fast rewind of the tape.

Each of the decks included in a preferred embodiment of the invention is adapted to record onto a first track the voice portion of the voice data and to record onto a second track discrete frames of magnetized patterns indicative of the time that the voice portion was recorded. The recall deck includes means for maintaining a magnetic playback transducer adjacent the tape during rapid transport of the tape. At the beginning of each message, the recording of the time pattern is interrupted to permit the aforementioned predetermined signal pulse to be recorded onto the second track as a short burst at a frequency below the normal playback frequency response capability of the recorder. Because of the increased speed during rewinding, the short bursts are reproduced at a frequency within the capability of the recorder, while the time signals are not reproduced, being outside the playback frequency response capability.

Preferably, the recorder of the present invention further comprises a second logging tape deck adapted to be sequentially operated together with the first logging deck, and a switching network for automatically activating the second logging deck to initiate recording the voice data thereon in the event a faulty recording is produced by the first deck. When the recall deck is not being used for recall, it records the same voice data as is being recorded by whichever of the logging decks is in operation. Hence, the recall deck normally contains recently received information and permits ready access thereto without interrupting the logging of new incoming voice data. As soon as any recall procedure has been completed, the recall deck is put back into its monitoring function. To facilitate this, it is preferred to equip the recall deck with a counter which starts at zero when rewind is initiated, the monitoring being reactivated as soon as the counter returns to zero.

DESCRIPTION OF THE PREFERRED EMBODIMENT

Figure 1:
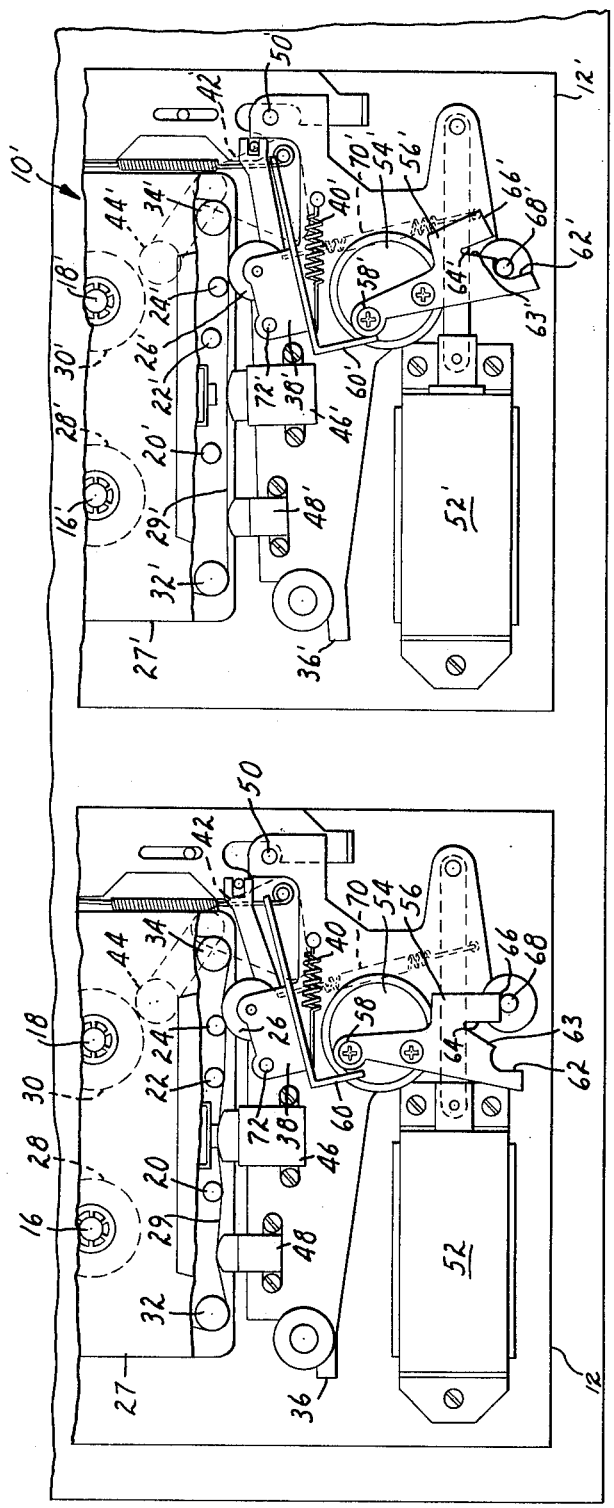
FIG. 1 is a cut-away top view of a preferred embodiment of the logging decks associated with the voice logging recorder of the present invention.

In the preferred embodiment of the present invention, the voice logging recorder includes two logging decks, each of which has a driving mechanism similar to that set forth in U.S. Pat. No. 3,542,312 (Erickson). A cut-away top view of such logging decks is shown in FIG. 1. As may there be seen, each of the decks includes a frame 12, 12' and a tape transport assembly mounted on the frames 12, 12'. The assembly includes spindles 16, 16' and 18, 18' for supporting supply hubs 28, 28' and take-up hubs 30, 30', positioning pins 20, 20' and 22, 22', a capstan 24, 24' and a pressure roller 26, 26'. The assemblies are adapted to receive preloaded magazines such as standard "Philips"]type cassettes 27, 27' containing magnetic recording tapes 29, 29! on the supply and take-up hubs 28, 28' and 30, 30', respectively. The tapes 29, 29' thus extend along tape transport paths extending from one side of the cassettes 27, 27', adjacent the guides 32, 32', along the positioning pins 20, 20' and 22, 22', between the capstans 24, 24' and pressure rollers 26, 26', around the guides 34, 34', and thence onto the take-up hubs 30, 30'. The assemblies further provide means (not shown) for driving the spindles 16, 16' and 18, 18' and capstans 24, 24' in a conventional manner. The driving mechanisms preferably further include movable carriages 36, 36' which are mounted on the frames 12, 12' on pivots 50, 50', such that the energization of the solenoids 52, 52' and 54, 54' enable the rotation of the carriages 36, 36' so as to bring the erase and record/playback heads 48, 48' and 46, 46', respectively, and the pressure rollers 26, 26' into contact with the tapes 29, 29'. The carriages 36, 36' are provided with latching mechanisms including the arms 56, 56', which when moved, position the respective detents 62, 62', 64, 64' and 66, 66' against stop members 68, 68', thus maintaining the carriage and the members mounted thereon in either a standby position, at which the pressure rollers 26, 26' are either in a stop or a pause mode position, and a run mode position. Various details of these transport mechanisms are the invention of Messrs. Pastor, Erickson and Kahn and are disclosed and claimed in the copending application referenced hereinabove.

In addition to the transport mechanism which enables the tapes to be moved at high speeds for rewind and fast forward operations and at a uniform speed for recording, the decks preferably further include networks for generating input signals indicative of incoming voice data. These networks enable the decks to be switched to the run mode position in response to the input signal and desirably include verification networks which are activated upon the insertion of a magazine into the deck. The details of the recorder including these networks are the invention of Messrs. Pastor and Argento and are disclosed and claimed in the copending patent application referenced hereinabove.

In the embodiment shown in FIG. 1, the deck 10 is dedicated to logging operations while the deck 10' is dedicated to recall operations. In FIG. 1, the logging deck 10 is shown in its run mode position, i.e., with the detent 66 of the arm 56 adjacent the stop member 68, and with the erase and record/playback heads 48 and 46, respectively in full contact with the tape 29. The deck is thus shown in the position occupied when logging incoming voice data. In contrast, the recall deck 10' is shown in a standby mode position, i.e., with the detent 62' adjacent the stop member 68'. This deck would, for example, be in the position shown during rewinding of the tape 29 in response to a recall command, with its record/playback head 46' adjacent the tape 29 to enable retrieval of recorded information during rewind while the logging deck 10 is maintained in its run mode position for recording incoming data.

This recorder also includes a network enabling intermittent actuation of both the logging deck 10 and the recall deck 10' in response to an input signal associated with the beginning of a message containing the voice data in order to log the voice data onto the tapes 29, 29' of each deck 10, 10'. In order to enable the recall of a given message recorded on the recall deck 10', the recorder also includes means for recording onto the recall deck 10' a predetermined signal pulse upon the actuation of the decks in response to each input signal, and means for sensing each recorded signal pulse during fast rewind of the tape 29'. The details of these networks and circuits are set forth hereinbelow.

Figure 2:
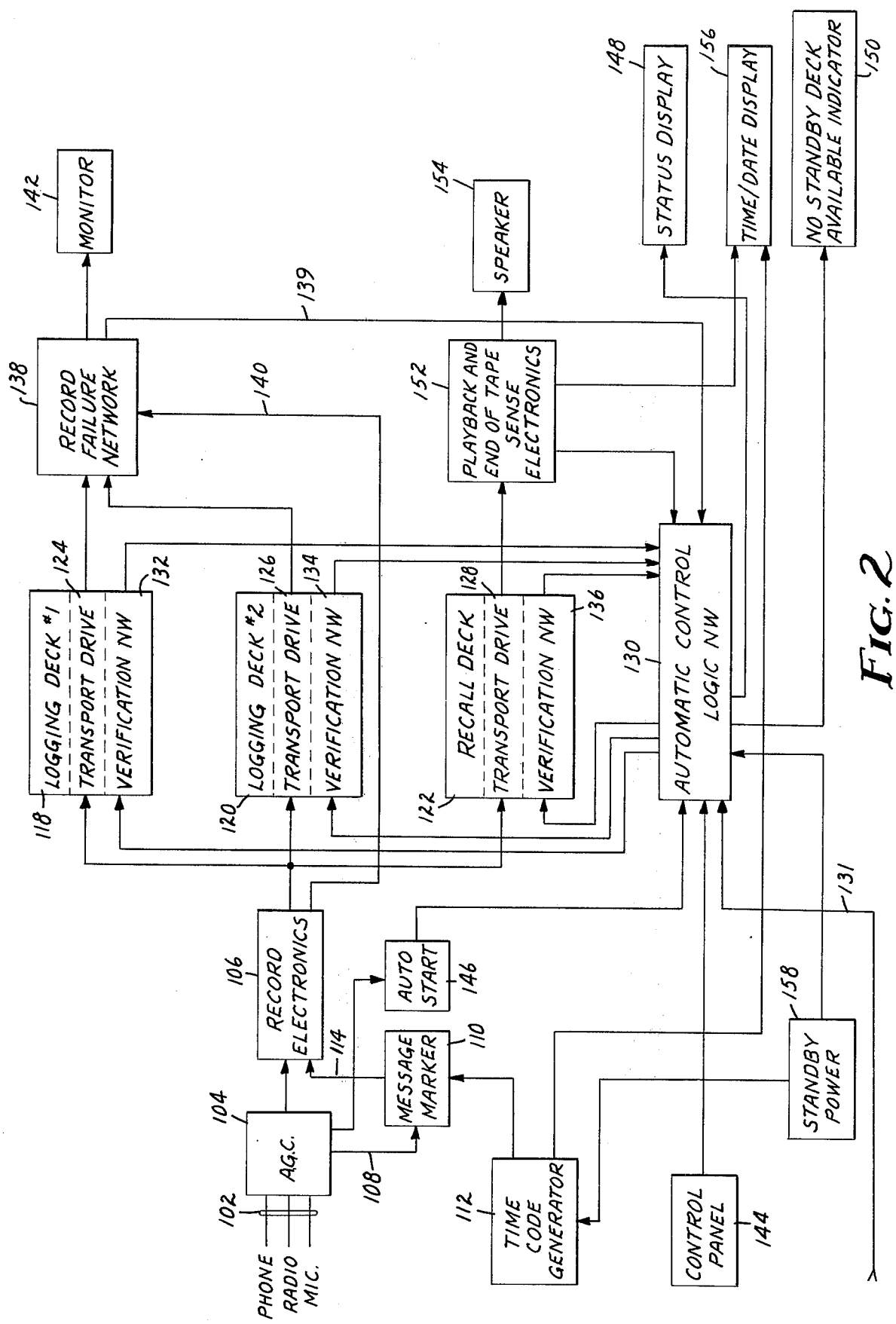
FIG. 2 is a block diagram of a preferred embodiment of the voice logging recorder of the present invention.

A block diagram of a preferred embodiment of the voice logging recorder of the present invention is shown in FIG. 2. As is there set forth, the recorder is adapted to receive voice data such as that provided from telephone lines, radio and microphone outputs on leads 102. While the recorder of the present invention is primarily directed to recording audio information, the term "voice data" as used herein is also intended to include all types of data, be it human voice, instrumental, electronic, teletype, etc. These signals are coupled through an automatic gain control (AGC) circuit 104 to normalize the level of the input signals. The output of the AGC circuit 104 is coupled to the record electronic circuit 106 which amplifies the signals and adds the record bias signal in a conventional manner. The AGC circuit 104 also provides an input signal pulse on lead 108 which is coupled to a message marker switch circuit 110 in order to provide a time burst signal indicative of the beginning of each message.

Inasmuch as logging recorders of necessity require recording information indicative of the time at which the data to be recorded was received, a time code generator 112 is provided. The output from the generator 112 is coupled to the message marker switch circuit 110, wherein the time code signal from generator 112 is interrupted by the message marker signal. The time shared time code and message marker signal is coupled on lead 114 to the record electronics circuit 106 wherein the bias signal is added to provide the composite time code record signal, which signal is applied to the time track record heads of the respective decks. Additional details of the circuit 110 and generator 112 are included in the description of FIG. 4 hereinbelow. The record electronics circuit 106 thus provides signals suitable to drive both the voice data and time data record heads of the respective tape decks.

The recorder of the present invention preferably includes three tape decks 118, 120 and 122. Additional decks may also be included if desired to extend the recording capability. Thus, while only two decks are shown in FIG. 1 (i.e., the logging deck 10 and the recall deck 10'), in the preferred embodiment shown in the block diagram of FIG. 2, two decks 118 and 120 respectively, are dedicated to voice logging operations while the third deck 122 is dedicated to data recall operations. The decks 118, 120 and 122 each include a transport drive mechanism 124, 126 and 128, respectively, such as that described in conjunction with the decks 10 and 10' of FIG. 1, which mechanisms may be switched between a run mode position, a pause mode position and a stop mode position by the appropriate energization of the solenoids 52 and 54 of each deck. Preferably, each deck is electrically actuatable by control signals from an automatic control logic network 130. If additional decks are provided, control signals therefrom are coupled to the automatic control logic network 130 via leads 131. Each deck also includes a verification network 132, 134 and 136, respectively. The verification networks are activated upon the insertions of a cassette into a given deck and ensures the operability thereof. Switching networks are also provided in order to enable automatic activation of the second logging deck in the event a faulty recording is produced by the first deck. The details of the verification networks are disclosed and claimed in the copending application by Messrs. Pastor and Argento referred to hereinabove.

The automatic control logic network 130 provides the overall control of the recorder. This network is responsive to appropriate signals from a control panel 144 to allow manual switching between continuous record and voice actuated record modes. The panel 144 also provides signals enabling the switching of the recall deck 122 between record, stop, play, fast forward and rewind modes. Recall and cue controls on the panel 144 enable the tape of the recall deck 122 to be automatically rewound to recall a given message and to be automatically readvanced to the end of the last recorded message such that recording of newly received voice data is reinitiated thereon.

The control logic network 130 is also responsive to an auto-start signal enabling voice actuation of the respective decks. Such a signal is provided by an auto-start circuit 146 which responds to a signal from the AGC circuit 104 indicative of the presence of a message, and thereby activates and deactivates the control logic network 130 at the beginning and end of each message.

The automatic control logic network 130 is responsive to signals from the control panel 144 to enable playback of a previously recorded message on the tape of the recall deck without interrupting the recording of incoming data onto the logging decks 118 and 120. This portion of the network 130 is responsive to the output from the playback signal processing network 152, which network receives the output from the playback heads of the recall deck 122. The received voice data is then coupled to an appropriate output such as speaker 154. The time code data is coupled through an appropriate override switching circuit in the time/date display 156 to display the time at which the data being retrieved was recorded. A signal from the time code generator 112 is also coupled to the display 156 to enable display of the real time when the recall deck is not in its playback mode. Details of the circuits for thus controlling the functions of the recall deck are provided in the discussion of FIG. 4.

Figure 3:
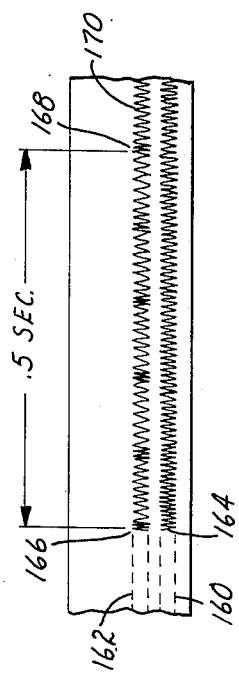
FIG. 3 is a top view of a section of magnetic recording tape having an exemplary magnetized pattern thereon such as would be produced by the recorder of the present invention.

In order to simultaneously record both the incoming voice data and a time code indicative of the time at which the incoming data was received, the record/playback heads 46 of each of the decks are provided with dual track capabilities such that the voice data is recorded on one track of the tape 29 while the time data is recorded on a second track. FIG. 3 is a representation of a section of magnetic recording tape showing typical data contained in the two tracks as though viewed through a magnetic viewer making visible the magnetic fields therein. In that figure, a voice signal is partially shown in the first track 160 while the associated timing code pattern is shown as a second track 162. The beginning of a message, i.e., the start of the modulated portion 164 of the voice track 160 is identified in the timing track as an approximately five-cycle burst of 10 Hz oscillations extending over the interval 166 and 168. Upon the completion of the five-cycle burst, the timing track 162 comprises a train of binary coded decimal signals 170. In a preferred embodiment, the timing signals comprise a frequency shift key modulation of a carrier containing 960 transitions or bit periods per second. A pulse extending the full period of such transitions represent binary 37 0'"s and transitions extending for half a period represent binary "1"'s.

Figure 4:
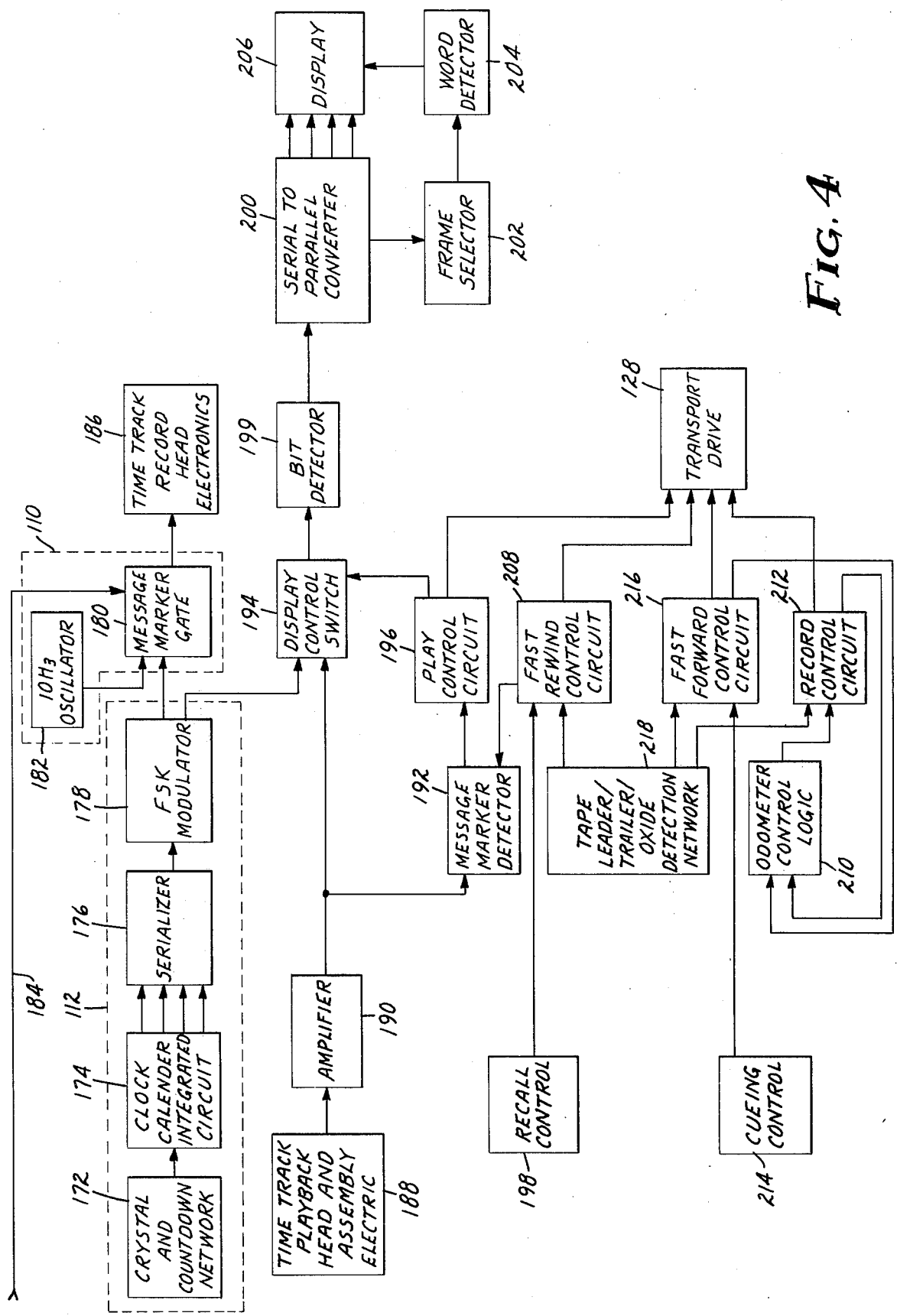
FIG. 4 is a more detailed block diagram of portions of the embodiment shown in FIG. 2.

Various details of the time code generator and recall circuits of the present invention are set forth in FIG. 4. The time code generator (112, FIG. 2) is there indicated to comprise a crystal and countdown network 172, a clock calendar integrated circuit 174, a serializer 176, and a frequency shift key modulator 178. The crystal and countdown network 172 is desirably a conventional integrated circuit chip providing a base oscillator frequency of about 1 MHz, together with a frequency divider circuit for reducing the base frequency to that required by the clock calendar integrated circuit 174. As in the preceding network, this circuit is preferably a conventional integrated circuit chip such as type FCM7002 manufactured by Fairchild Semiconductor, Inc., and provides a parallel output digital signal indicative of minutes and hours interspersed with data indicative of the days and the months. A particularly desirable integrated circuit chip further includes an output which may be used to indicate seconds. In the present invention, this output is desirably used to provide unique information indicative of the beginning of each time frame. The parallel output from the clock calendar circuit 174 is fed to a conventional serializer network 176. A single output from the serializer is then coupled to the frequency shift key modulator 178. This modulator is desirably a conventional integrated circuit chip.

The output from the modulator 178 of the time code generator 112 is coupled to the message mark network 110. This network includes a message marker gate 180 and a 10 Hz oscillator 182. The gate 180 is triggered in response to an input signal pulse on lead 184 indicative of the beginnning of each message. When such a signal is received, the gate passes a one-half second burst from the 10 Hz oscillator and then allows the time code signals to resume, thus providing at the output from the gate a modulated time code signal identifying the beginning of each message and the time over which it extends. This output signal is coupled to the time track record head and associated electronics 186 and thereupon recorded on the time track of the tape of the recall deck.

When the time track code signal thus recorded on the tape of the recall deck is reproduced by the playback head together with the associated electronics 188, the playback signal is coupled through a conventional amplifier 190 and thence in parallel to a message marker detector 192 and a display control switch 194. In order to enable the rapid location of the beginning of each message during rapid rewinding of the tape, it is desirable to be able to automatically detect the 10 Hz signal pulse previously recorded on the time track. This capability is provided in the message marker detector 192. If the previously recorded 10 Hz signals were replayed at the same speed as that employed during recording, the frequency would be below the playback frequency capability of the recorder. However, during rapid rewind, the tape is moved at an appreciably greater speed such that the frequency of the reproduced signals is correspondingly multiplied. This results in the 10 Hz signal burst falling within the playback frequency capability of the recorder, while the remainder of the time track signals are in excess of the playback capability of the recorder. Accordingly, the message marker detector 192 is designed to respond to the presence of an audio signal during rapid rewind operations and provides a signal to the play control circuit 196 when a signal corresponding to the 10 Hz pulse is detected. This control circuit 196 then shifts the recall transport drive 128 into the play mode.

The recall control 198 is coupled to the fast rewind control circuit 208 in order to activate the fast rewind mechanism of the transport drive 128. The deck 128 is thus maintained in the fast rewind state until the play control circuit 196 switches in response to the detection of a message marker. The recall control 198 is also coupled to the message marker detector 192 through the circuit 208 such that a continuous signal from the control 198 causes the play command signals corresponding to the 10 Hz signal pulses to be ignored, thus continuing the rewinding of the tape to allow still earlier messages to be located.

Another output from the amplifier 190 is coupled to the display control switch 194. This switch is triggered by a signal from the play control circuit 196 and enables either a signal corresponding to the real time from the time code generator 112 or corresponding to the time at which the recalled information was recorded to be further processed. Either of these two signals are then coupled through the switch 194 to a bit detector 199 which demodulates the frequency shift key code and provides a serial binary coded representation of the time code. This serial signal is then converted to a conventional binary coded parallel signal by the serial to parallel converter circuit 200. A signal from the converter and amplifier 200 is coupled to the frame selector circuit 202 which detects the unique signal provided from the clock calendar integrated circuit 174 indicative of the beginning of each frame of time data. The selected frame information is then coupled to a word detector 204 which breaks the information within each frame into discrete words associated with the minute and hours, and the corresponding day and month data. These discrete patterns, together with the parallel outputs from the converter and amplifier 200, are coupled to a conventional display unit 206 on the panel of the recorder.

In order to enable the tape of the recall deck to be automatically advanced to the end of the last recorded message and to reinitiate recording at that location, it is desirable to identity the position of the tape prior to recall such that the tape may subsequently be returned to that same position. In the preferred embodiment of the present invention, a tachometer such as that disclosed in the companion application of Pastor and Argento referred to hereinabove is provided on the take-up spindle 18' (FIG. 1). The output from such a tachometer is produced as a part of the record control circuit 212 and is coupled to an odometer control logic network 210, which network enables a given odometer setting to be maintained in memory. A comparator circuit is included in the network for noting a given position and for controlling tape movement until the given tape position corresponds with the position stored in memory. In a preferred embodiment, a signal from the record control circuit 212 holds the count held in the logic memory at zero until the commencement of recall operations. The cueing control 214 on the control panel 144 (FIG. 2) is provided to initiate repositioning of the tape upon completion of the recall operations. When the control 214 is activated, a signal is coupled to the fast forward control circuit 216 to enable fast forward advancement of the tape of the transport drive 128. When the odometer control logic 210 again indicates a zero count on the odometer, the record control circuit 212 switches the transport drive into the normal record mode.

In order to maximize the information recorded on the tape of the recall deck, i.e., to minimize the information lost, the deck is further provided with a network 218 for sensing the end of the tape, for automatically rewinding the tape to the start thereof and for automatically reinitiating recording thereon. This network includes a tape trailer detector such as a photocell and associated light source, a signal from which indicates the end of the tape. A signal from this detector is coupled to the fast rewind control circuit 208 to thereupon switch the transport drive 128 into a fast rewind mode. The tape leader detector such as a similar photocell/light source combination thereupon senses the presence of the transparent leader portion of the tape. The output of this detector is coupled to the fast forward control circuit 216 to switch the transport drive 128 into a fast forward mode. An oxide detector is further preferably provided to detect the beginning of the magnetic tape adjacent the record head, an output of which is coupled to the record control circuit 212 for thereupon switching the transport drive 128 into the record mode.

In operation, in order to recall a given message on the tape of the recall deck, the operator merely activates the recall control 198. Signals from the control 198 are coupled to the fast rewind control circuit 208 to thereupon switch the transport drive 128 into the pause mode position while the tape is rapidly rewound. At the same time, the display control switch 194 is switched to provide a display of the recall time code. An output from the fast forward control circuit 208 starts the odometer control logic 210 to count tape sections so as to enable repositioning of the tape upon completion of the recall operation. While in the pause mode position, the record/playback head 46' is positioned adjacent the tape 29', thus enabling the detection of the beginning of a message by the message marker detector 192. This in turn causes the play control circuit 196 to switch the transport drive 128 into the run mode position such that the voice portion of the signal on the tape of the recall deck is then coupled to the speaker 154 (FIG. 2). Upon a command from the cueing control 214, the fast forward control circuit 216 switches the transport drive 128 into a fast forward mode and activates the odometer control logic 210, such that when the odometer count again returns to zero, the record control circuit switches the transport drive to the run mode position, thus reinitiating recording of new incoming voice data on the tape.

The specific circuits and networks utilized in the preferred embodiment discussed hereinabove are conventional and well known to those skilled in the art. While the integrated circuit chips such as are commercially available are particularly designed for use in many of the circuits, circuits designed around discrete components, electromechanical analogs and the like are also within the scope of the present invention.

Having thus described the present invention, what is claimed is:

1. A voice logging recorder comprising
    a logging deck including means for recording voice data onto magnetic recording tape passing therethrough,
    a recall tape deck including means for recording or playing said voice data while recording on the other deck to enable on-line recall of voice data without interruption of the recording of voice data onto the tape of the logging deck, means enabling intermittent actuation of the decks in response to an input signal associated with the beginning of a message containing the voice data to log the voice data onto tape of each deck, means for recording on the tape of the recall deck a predetermined signal pulse upon the actuation of the decks in response to a said input signal, and means for sensing each recorded signal pulse to locate the beginning of each recorded message during fast rewind of the tape in the recall deck.

2. A voice logging recorder according to claim 1, wherein each deck is adapted to record onto a first track the voice portion of said voice data and onto a second track discrete frames of magnetized patterns indicative of the time that the voice portion was recorded.

3. A voice logging recorder according to claim 2, further comprising means for generating a signal containing a binary coded decimal representation to provide said frames.

4. A voice logging recorder according to claim 3, wherein said binary coded decimal time signal generating means includes means for establishing as the binary coded decimal signal a reference frequency to indicate binary "0" and a second frequency twice that of the reference frequency to indicate binary "1".

5. A voice logging recorder according to claim 3, wherein said time signal generating means further comprises means for including in the binary coded decimal signal discrete frames each representing the hour and minute interspersed with frames representing the day and the month associated with the voice recording.

6. A voice logging recorder according to claim 2, further comprising display means for providing a visual representation of said time, said display means being coupled to display the time at which data is logged onto the first track during normal logging operations and to display the time at which the data was logged onto the first track of the recall deck during playback of the recall deck.

7. A voice logging recorder according to claim 2, further comprising standby power supply means for supplying power in the event of failure of primary power supplies to maintain correct time information and to prevent the loss of logic states associated with the mode of operation in which the recorder was operating at the time of said power failure.

8. A voice logging recorder according to claim 1, wherein said recall deck further comprises means for automatically sensing the end of tape, rewinding and re-initiating recording to minimize the loss of voice data recorded onto the tape of the recall deck.

9. A voice logging recorder according to claim 1, wherein tape movement in a said deck is automatically actuated in response to voice data.

10. A voice logging recorder according to claim 1, further comprising a second logging deck adapted to be sequentially operated together with the first logging deck and means for automatically activating the second deck to initiate recording the voice data thereon in the event the first logging deck is inoperative.

11. A voice logging recorder according to claim 10, wherein the recall deck comprises means for maintaining a magnetic playback transducer adjacent the tape to allow the detection of the recorded predetermined signal pulse during rapid transport of the tape.

12. A voice logging recorder according to claim 11, wherein the recall deck includes means for recording a signal pulse having a frequency below the audio range.

13. A voice logging recorder according to claim 12, further comprising means for rewinding the tape at a rate substantially greater than that provided during recording, and means for sensing an output from the playback transducer to produce a signal from each predetermined signal pulse and which because of the increased tape speed is produced at a frequency within the playback frequency response capability of the recorder while the remainder of the signals are produced at correspondingly higher frequencies outside the playback frequency response capability of the recorder.

* * * * *

UNITED STATES PATENT AND TRADEMARK OFFICE
CERTIFICATE OF CORRECTION

PATENT NO. : 4,012,784
DATED : March 15, 1977
INVENTOR(S) : Robert L. Murphy and Dan J. Argento It is certified that error appears in the above-identified patent and that said Letters Patent are hereby corrected as shown below:

Column 2, line 63, delete "]".

Column 2, line 65, change "29!" to -- 29' --.

Column 5, line 64, "binary 37 0"'s and" should read -- binary "0"s and --.

Signed and Sealed this fifth Day of July 1977

[SEAL]

Attest:

RUTH C. MASON
Attesting Officer

C. MARSHALL DANN
Commissioner of Patents and Trademarks